May 2, 1944.      W. DZUS      2,347,675
FASTENER ASSEMBLY
Filed Jan. 3, 1942      3 Sheets-Sheet 1
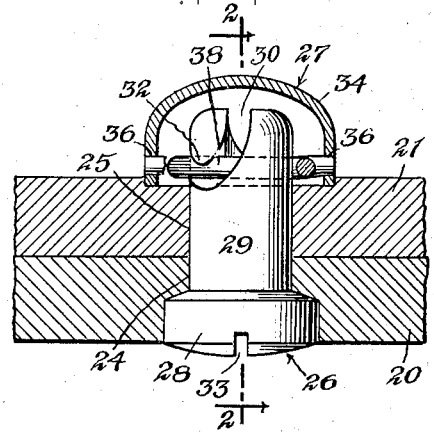
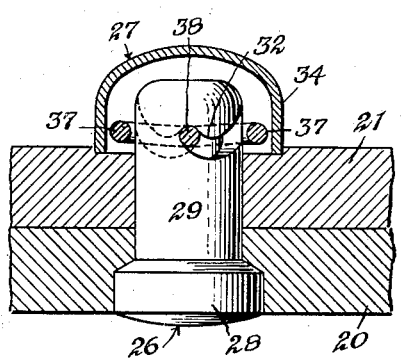
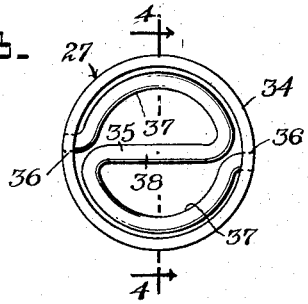
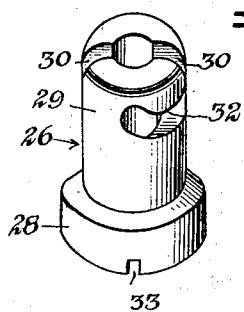
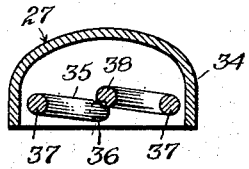
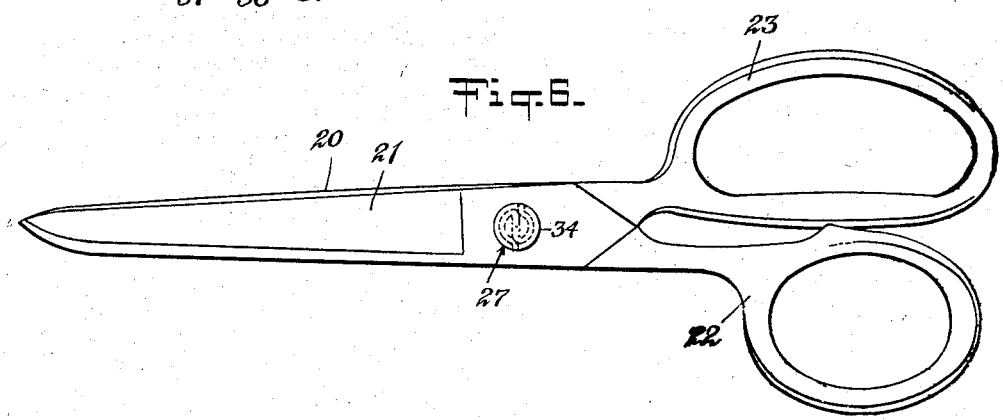
INVENTOR
William Dzus
BY
ATTORNEYS

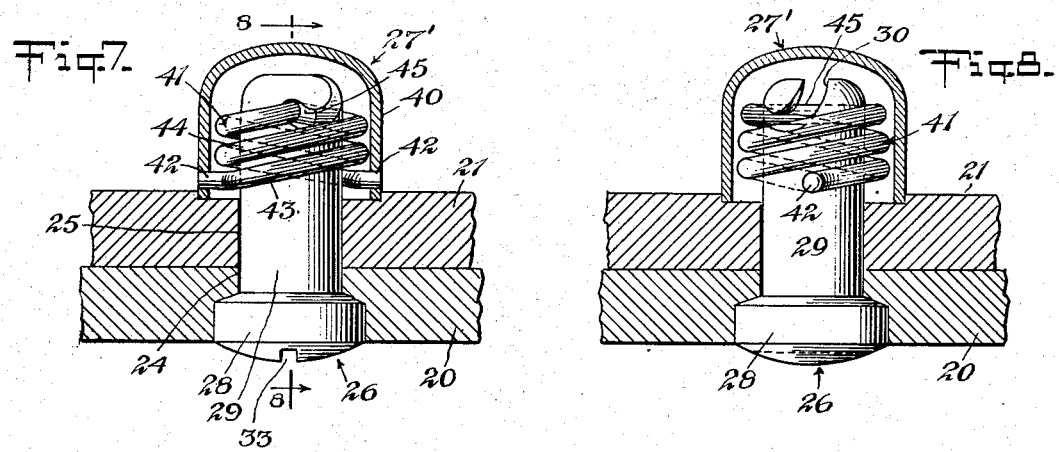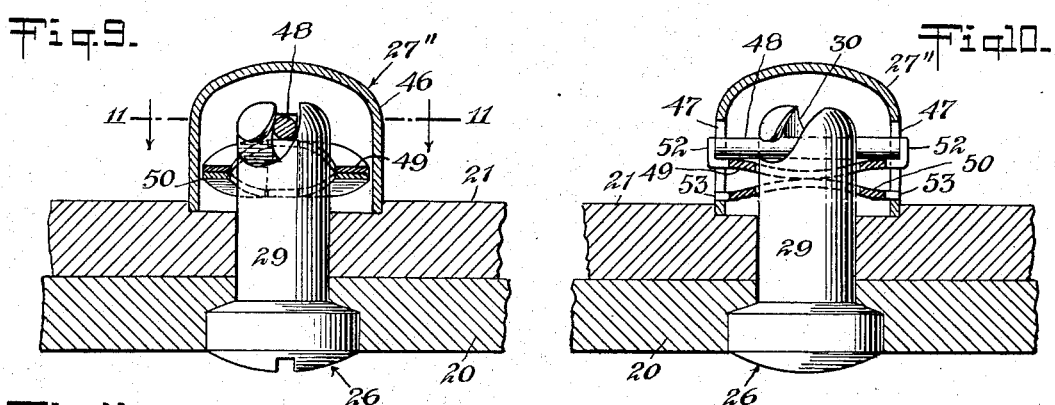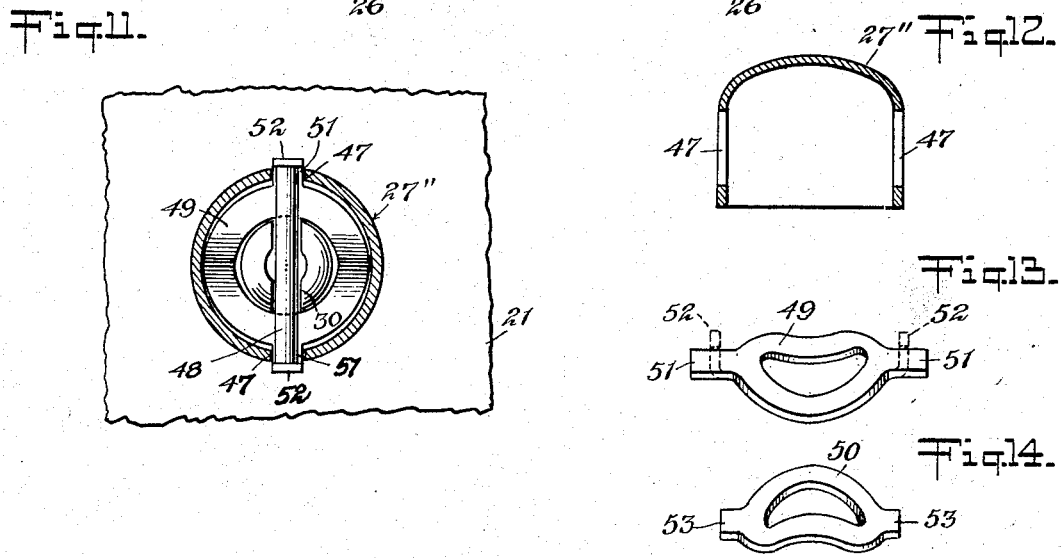

May 2, 1944.  W. DZUS  2,347,675
FASTENER ASSEMBLY
Filed Jan. 3, 1942  3 Sheets-Sheet 3
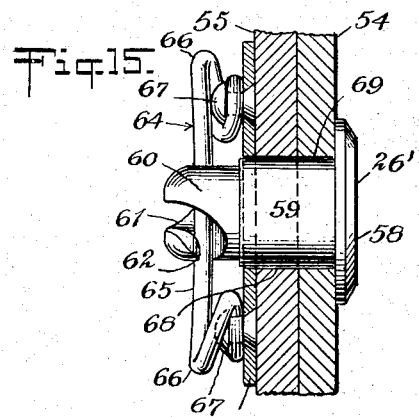
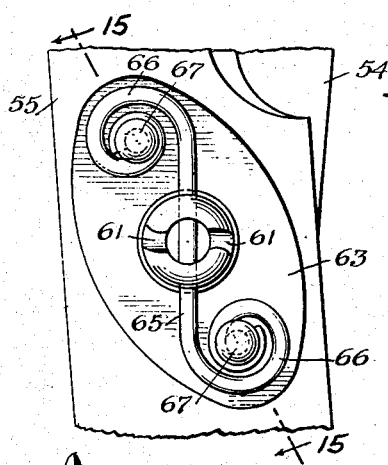
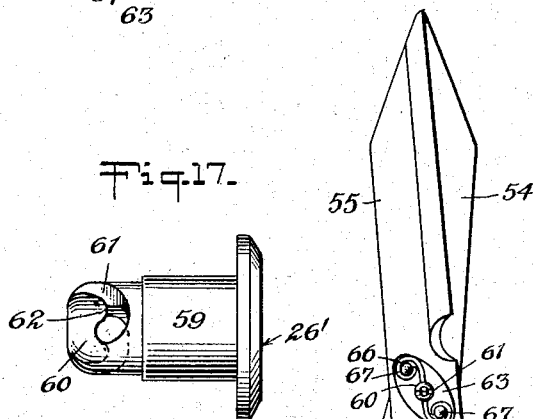
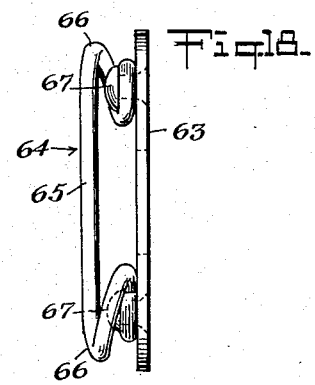
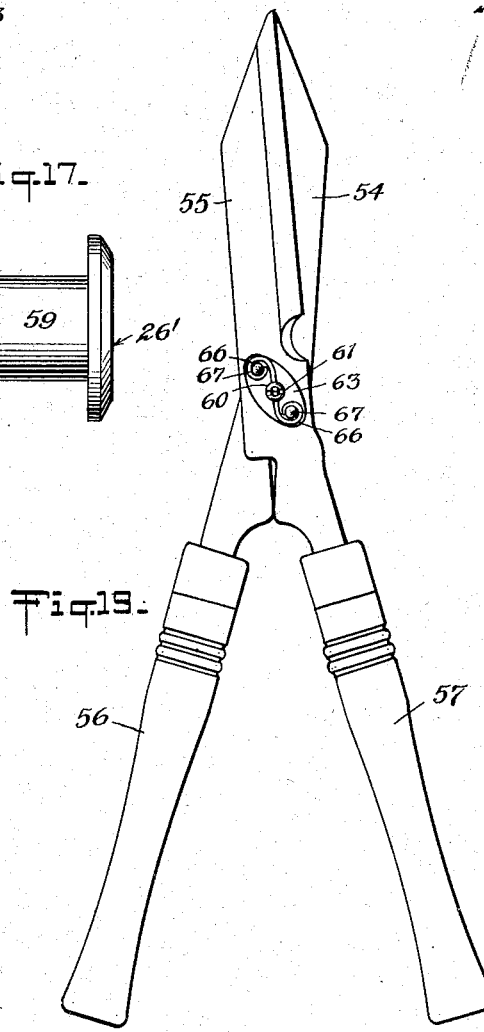
WITNESSES
INVENTOR
William Dzus
BY
Munn, Liddy, Glaccum & Kane
ATTORNEYS Patented May 2, 1944

2,347,675

UNITED STATES PATENT OFFICE 2,347,675

FASTENER ASSEMBLY

William Dzus, West Islip, N. Y.

Application January 3, 1942, Serial No. 425,523

11 Claims. (Cl. 24—221)

This invention relates to an improved fastener assembly.

It is a particular object of the present invention to provide an improved fastener assembly which may be used for pivotally and releasably securing two or more parts together under spring tension.

One of the objects of the above invention is to provide an improved fastener assembly of the above type which may be readily assembled and dis-assembled and which, when assembled, will firmly and securely retain the parts together under spring tension.

A further object is the provision of an improved readily releasable fastener assembly of relatively simple and inexpensive construction, but which is nevertheless rugged and durable so as to withstand substantial usage.

Other objects will be apparent from the following detailed description of the drawings, in which Fig. 1 is an elevational view partially in section of a fastener assembly embodying my invention;

Fig. 2 is a similar view in the direction of the arrows on the line 2—2 of Fig. 1;

Fig. 3 is a bottom plan view of the anchoring or connecting member of the fastener assembly;

Fig. 4 is a sectional view in the direction of the arrows on the line 4—4 of Fig. 3;

Fig. 5 is a perspective view of the stud member of the fastener assembly;

Fig. 6 is a plan view of a pair of scissors or shears incorporating my fastener assembly;

Figs. 7 and 8 are longitudinal sectional views at 90° angles to each other of a modified type of fastener assembly;

Figs. 9 and 10 are longitudinal views partially in section at 90° angles to each other of a second modified type of fastener assembly;

Fig. 11 is a sectional view in the direction of the arrows on the line 11—11 of Fig. 9;

Fig. 12 is a longitudinal sectional view of the supporting portion of the anchoring member of the second modified type of fastener assembly;

Figs. 13 and 14 are perspective views of the spring members used in the anchoring member of the second modified form of my invention;

Fig. 15 is a sectional view in the direction of the arrows on the line 15—15 of Fig. 16, of a third modified form of fastener assembly;

Fig. 16 is a plan view from one side of the third modified form of fastener assembly;

Fig. 17 is a side view of a stud member which may be employed in the third modified form of my invention;

Fig. 18 is a side view of the anchoring member which may be employed in the third modified form of my invention; and Fig. 19 is a view of a pair of hedge shears having the third modified form of my invention applied thereto.

My improved fastener assembly is particularly suited for pivotally securing together two or more members under tension and the fastener assembly is illustrated in the accompanying drawings as applied to shears or scissors. However, it should be understood that my fastener assembly may be used in many other associations where it is desired to releasably secure two or more members together.

Referring more particularly to the first six figures of the drawings, the fastener assembly is shown as pivotally securing together the two blades 20 and 21 of a pair of scissors. The scissors are of the conventional type having handles 22 and 23 formed integrally with the upper ends of the blades 20 and 21. At a point adjacent the handles, the blades are provided with apertures 24 and 25, in registry with each other, and through which they are pivotally secured together by means of my improved fastener assembly.

The fastener assembly comprises a stud member 26 and an anchoring member 27 which may be engaged with each other or released from engagement by means of a simple rotary motion.

The stud member is of the type shown in my Patent No. 1,955,740, granted on April 24, 1934, and is provided with an enlarged head 28 and with a tubular shank 29, formed with oppositely disposed spiral cam slots 30 extending inwardly from the end of the shank, and each having a shoulder 32 to prevent accidental retrograde movement or rotation of the stud member with respect to the anchoring member. To facilitate the rotation of the stud member, suitable means, such as a handle or the kerf 33 may be provided. The blade 20 may be recessed around the aperture 24, in the manner shown, so as to accommodate the head 28 of the stud.

The anchoring member comprises a supporting portion which, in the present embodiment of my invention, is in the form of a cup 34, which supports a spring member 35, in such a manner that it may be interengaged with the spiral cam slots in the stud member.

In the first form of my invention, the spring takes the form of a unitary spring wire having its two ends frictionally engaged in apertures 36, formed on substantially opposite sides of the cup-shaped supporting member, near the lower end thereof. The portions of the spring wire adjacent the ends are formed in semi-circular coils 37, connected by an intermediate straight portion 38, which is adapted to interengage with the slots in the stud member. The blade 21 is preferably formed with a recess around the aperture 25, which is adapted to accommodate the lower end of the cup-shaped supporting member, in the manner shown.

In using the illustrated fastener assembly, the blades 20 and 21 are assembled in the usual manner and the stud member is inserted through the apertures 24 and 25, while the anchoring member is placed on the opposite side of the aperture 25. If the stud member 26 is then rotated in a clockwise direction, the spiral cam slots 30 will engage the straight intermediate portion 38 of the spring 35, drawing it along the slots until it is locked behind the shoulders 32. The parts are so proportioned that when the spring is locked behind the shoulders, it is under tension, with the result that the fastener assembly forces or urges the two blades 20 and 21 towards each other. It will be appreciated that this is desirable in a pair of shears in that the cutting edges will be held in contact with each other. To release the fastener assembly, the stud member should be rotated in a counter-clockwise direction.

It will be appreciated that the coils 37 enhance the resiliency of the spring member 35 and also enable the portion 38 to "give" or move sufficiently to pass over the shoulders 32.

In the form of fastener assembly shown in Figs. 7 and 8, I employ the same type of stud member 26. However, I employ a modified type of anchoring member 27'. The anchoring member 27' consists of a supporting portion in the form of a cup 40 which is preferably slightly deeper than the cup 34 in the first form of my invention. In the cup-shaped supporting member, I mount a double coiled helical spring 41, preferably made of a unitary piece of spring wire, having its ends frictionally engaged in apertures 42, formed in opposite sides of the supporting member, near the lower end thereof.

The spring extends upwardly from the two ends in the double coils or helices 43 and 44, which are connected together at their upper ends by means of the relatively straight transverse portion 45.

The fastener assembly shown in Figs. 7 and 8 is used and assembled in the same manner as the fastener assembly shown in the first form of my invention. Thus, the anchoring member is placed on one side of the blade 21 so as to cover the aperture 25, and the stud 26 is inserted through the apertures 24 and 25, into the cup-shaped supporting member 40. The parts are so proportioned that the straight portion 45 of the spring will then rest in the entrance branches of the slots 30. When the stud member is rotated in a clockwise direction with respect to the anchoring member, the straight portion 45 of the spring will be drawn along the cam-like slots until it is locked behind the shoulders 32. The spring 41 will then be compressed in the manner shown, so as to exert a force against the slotted end of the stud in a direction away from the head. The fastener assembly will thus be firmly retained against accidental release and will pivotally secure the two blades 20 and 21 together under tension.

In the modified form of fastener assembly shown in Figs. 9 to 14, inclusive, I again employ the same type of stud member 26. However, I employ a further modified type of anchoring member 27" in which a cup-shaped supporting portion 46, having oppositely disposed longitudinally extending slots 47, is provided. Disposed in the slots 47, for longitudinal movement and so that it may interengage with the spiral slots 30 in the stud member, is the transverse pin 48 which is normally urged towards the closed end of the supporting portion by means of a pair of bowed annular springs 49 and 50, having their convex surfaces in engagement with each other. The spring 49 is provided with a pair of oppositely disposed projecting wings 51 which extend through the slots 47 and are bent upwardly at right angles adjacent their ends, as shown at 52, so as to frictionally engage the two ends of the pin 48. The spring portion 50 is provided with relatively shorter projecting wings 53 which extend into the slots 47.

The fastener assembly shown in Figs. 9 to 14, is assembled and used in the same manner as the first two forms of my invention, the stud 26 being projected through the apertures 24 and 25 and into the cup-shaped portion 46. The parts are so proportioned that the pin 48 then rests in the entrance branches of the slots 30, as shown in Fig. 9. When the stud is rotated in a clockwise direction with respect to the anchoring member, the pin is drawn along the cam-like slots until it is locked behind the shoulders 32. The spring portion is then compressed, in the manner shown in Fig. 10, with the result that the pin 48 exerts a force against the slotted end of the stud member in a direction away from the head. The fastener assembly is thus firmly held against accidental release and it serves to pivotally secure the two blades 20 and 21 together under tension.

The form of fastener assembly shown in Figs. 15 to 19, inclusive, is relatively stronger and has relatively greater spring tension than the other forms of fastener assembly shown in the drawings. It is particularly suited for pivotally holding together two parts or articles where greater strength is required and where greater spring tension is desired. Thus it may be used to pivotally secure together the blades of a pair of hedge shears, such as is shown in Figs. 15 to 19.

The hedge shears are provided with a pair of blades 54 and 55 having handles 56 and 57, and pivotally secured together adjacent the central portion by means of my improved fastener assembly. In this form of fastener assembly, I have shown a stud member 26' which is of the same general type as shown in my Patent No. 1,955,740, but which is of slightly different detailed construction from the studs shown in the first three forms of my invention. Thus, the stud has a relatively large flat head 58 and a shank formed of two sections 59 and 60, the section 59 being of slightly greater diameter than the section 60. The section 60 of the shank is provided with oppositely disposed spiral slots 61 extending inwardly from the end thereof, and provided with shoulders 62 so as to prevent accidental retrograde rotation of the stud member with respect to the anchoring member.

The anchoring member consists of a supporting portion in the form of a flat plate 63 having a spring portion 64 secured to and supported thereon. The spring portion consists of a spring wire formed with an intermediate relatively straight portion 65 having spring coils 66 formed on opposite ends thereof, and secured to the supporting plate by suitable means, such as the rivets 67, extending through the coils and supporting plate.

The form of fastener assembly shown in Figs. 15 and 19 is used and assembled in the manner shown by placing the anchoring member over the aperture 68 in the blade 55 and by projecting the shank of the stud through the aperture 69 in the blade 54, and through the aperture 68, until the straight portion 65 of the spring rests in the entrance branches of the slots 61. By rotating the stud member 26' in a clockwise direction with respect to the anchoring member, the spring wire will be drawn along the cam-like slots until it is locked behind the shoulders 62. The spring member is then under tension and exerts a force against the slotted end of the stud in a direction away from the head. The result is that the two blades are pivotally held together, under tension.

It will thus be seen that I have provided an improved relatively simple and inexpensive fastener assembly which, while it may be used for other purposes, is particularly suited for pivotally securing together two parts or articles under spring tension.

It should be understood that modifications may be made in the illustrated and described embodiments of my invention without departing from the invention as set forth in the accompanying claims.

I claim:

1. In a fastener assembly a stud member and an anchoring member rotatable with respect to each other, the anchoring member comprising a cup-shaped supporting portion and a double coiled spring having a straight section connecting the double coils together mounted inside of the supporting portion, the said straight section being shiftable longitudinally of the cup-shaped portion and being normally held in a predetermined position and the stud member being provided with means for interengagement with the straight section of the spring when the stud member is rotated with respect to the anchoring member.

2. A fastener assembly as set forth in claim 1 in which the means on the stud member comprises a spiral slot extending inwardly from one end of the stud member and provided with a retaining shoulder.

3. In a fastener assembly for securing two parts together a stud member and an anchoring member rotatable with respect to each other and with respect to the parts, the anchoring member comprising a hollow supporting portion having a side wall, and means resiliently mounted therein so as normally to be held in a predetermined position but so as to be shiftable longitudinally of the side wall, and the stud member being provided with means for interengagement with the shiftable means of the anchoring member when the stud member is rotated with respect to the anchoring member.

4. In a fastener assembly a stud member and an anchoring member rotatable with respect to each other, the anchoring member comprising a supporting portion having a cylindrical side wall, a pin mounted transversely thereof and shiftable longitudinally of the cylindrical side wall, and resilient means for normally holding the pin in a predetermined position, and the stud member being provided with means for interengagement with the pin when the stud member is rotated with respect to the anchoring member.

5. In a fastener assembly a stud member and an anchoring member rotatable with respect to each other, the anchoring member comprising a hollow supporting portion having side walls and having longitudinally extending slots formed in opposite sides thereof, a pin extending transversely of the supporting portion and mounted in the slots so as to be shiftable longitudinally thereof, and a pair of annular members disposed in the supporting member and mounted in the slots, at least one of the annular members being resilient so as normally to hold the pin in a predetermined position, and the said stud member being cooperable to enter into the supporting portion of the anchoring member and project through the annular members, and being provided with means for interengagement with the pin so as to cause partial compression of the resilient member and releasably retain the members in interengaged relationship when the stud member is rotated with respect to the anchoring member.

6. In a fastener assembly a stud member and an anchoring member rotatable with respect to each other, the anchoring member comprising a supporting portion having an opening therein, a pin mounted transversely of the opening and shiftable with respect to the supporting portion, and resilient means for normally holding the pin in a predetermined position, the stud member being provided with means for interengagement with the pin when the stud member is rotated with respect to the anchoring member.

7. A fastener assembly for holding parts in assembled relationship, said fastener assembly comprising a stud member having a shank cooperable to project through the parts and an anchoring member comprising a support and a spring mounted on the support and having a portion shiftable with respect thereto, the shank of the stud member having means interengageable with the anchoring member upon rotation of one of the members with respect to the other to releasably retain the parts in assembled relationship under spring tension, the anchoring member being freely rotatable with respect to the stud member and parts.

8. A detachable fastener for maintaining two parts in close proximity under spring tension, which includes a rotatable stud member for connection to one part, provided with a spiral slot in one end and a detent at the inner recess of said slot, and a cooperating receptacle member for connection to the second part, said receptacle member having longitudinal slots at opposite sides thereof and having a spring with a portion providing a centrally disposed opening associated with the receptacle member and including a cross-bar member associated with said spring and adapted to be detachably fastened within the detent of said spiral slot and to be guided by said longitudinal slots.

9. A detachable fastener for maintaining two parts locked in close proximity under spring tension, which includes a rotatable stud member for connection to one part, provided with a spiral slot in one end and a detent at the inner recess of said slot, and a cooperating receptacle member for connection to the second part, said receptacle member including a collar member, a spring having a portion providing a centrally disposed opening associated with said collar, a cross-bar member associated with said spring member and adapted to detachably lock in said detent of said spiral slot with the spring under compression when the fastener stud and receptacle members are locked, and travel limit means for restricting the travel of said cross-bar member.

10. A detachable fastener for maintaining two parts locked in close proximity under spring tension, which includes a rotatable stud member for connection to one part, provided with a spiral slot in one end and a detent at the inner recess of said slot and a cooperating receptacle member for connecting to the second part, said receptacle member including a collar member, a spring having a portion providing a centrally disposed opening associated with said collar and a cross-bar member associated with said spring member and forming an integral part thereof and adapted to detachably lock in said detent of said spiral slot with the spring under compression when the fastener stud and receptacle members are locked.

11. A detachable fastener for maintaining two parts locked in close proximity under spring tension, which includes a rotatable stud member for connection to one part, provided with a spiral slot in one end and a detent at the inner recess of said slot, and a cooperating receptacle member for connection to the second part, said receptacle member including a collar member, a spring having a portion providing a centrally disposed opening associated with said collar, a cross-bar member associated with said spring member and adapted to detachably lock in said detent of said spiral slot with the spring under compression when the fastener stud and receptacle members are locked and guideways for guiding said cross-bar member.

WILLIAM DZUS.